United States Patent
Di et al.

(10) Patent No.: US 12,313,800 B2
(45) Date of Patent: May 27, 2025

(54) GROUND ROLL ATTENUATION USING UNSUPERVISED DEEP LEARNING

(71) Applicant: Schlumberger Technology Corporation, Sugar Land, TX (US)

(72) Inventors: Haibin Di, Houston, TX (US); Nicolae Moldoveanu, Houston, TX (US); Hiren Maniar, Houston, TX (US); Aria Abubakar, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 391 days.

(21) Appl. No.: 17/907,003

(22) PCT Filed: Mar. 22, 2021

(86) PCT No.: PCT/US2021/023415
§ 371 (c)(1),
(2) Date: Sep. 22, 2022

(87) PCT Pub. No.: WO2021/194933
PCT Pub. Date: Sep. 30, 2021

(65) Prior Publication Data
US 2023/0109902 A1  Apr. 13, 2023

Related U.S. Application Data

(60) Provisional application No. 62/993,817, filed on Mar. 24, 2020.

(51) Int. Cl.
*G01V 1/36* (2006.01)
*G01V 1/34* (2006.01)
(Continued)

(52) U.S. Cl.
CPC ............... *G01V 1/36* (2013.01); *G01V 1/345* (2013.01); *G06N 3/0455* (2023.01); *G06N 3/048* (2023.01);
(Continued)

(58) Field of Classification Search
CPC ...... G01V 1/36; G01V 1/345; G01V 2210/32; G01V 2210/74; G01V 1/364; G01V 1/282;
(Continued)

(56) References Cited

U.S. PATENT DOCUMENTS 10,664,963 B1 * 5/2020 Rossi ............... G06V 10/82
2018/0129917 A1 * 5/2018 Chu ............... G06V 20/48
(Continued)

OTHER PUBLICATIONS

Jia et al., "Separating Ground-roll from Land Seismic Record via Convolutional Neural Network", 2018 SEG Maximizing Asset Value through Artificial Intelligence and Machine Learning Workshop, 5 pages, Sep. 2018, available at: https://www.researchgate.net/publication/331439437_Separating_Ground-roll_from_Land_Seismic_Record_via_Convolutional_Neural_Network.
(Continued)

*Primary Examiner* — Solomon G Bezuayehu
(74) *Attorney, Agent, or Firm* — Jeffrey D. Frantz

(57) ABSTRACT

A machine-implemented method, at least one non-transitory computer-readable medium storing instructions, and a computing system are provided for attenuating noise. A computing system receives a seismic image and generates a first image using a first neural network configured to identify low-frequency ground roll in a seismic image, and a second image using a second neural network configured to identify reflections in the seismic image. A combined image is generated by combining the first image and the second image. The first neural network and the second neural network are adjusted to reduce a difference between the
(Continued)

combined image and the seismic image using frequency constraint to guide separation of the seismic image into the first image and the second image.

20 Claims, 11 Drawing Sheets

(51) Int. Cl.
    *G06N 3/0455*     (2023.01)
    *G06N 3/048*     (2023.01)
    *G06T 5/70*     (2024.01)

(52) U.S. Cl.
    CPC .......... *G06T 5/70* (2024.01); *G01V 2210/32* (2013.01); *G01V 2210/74* (2013.01); *G06T 2207/20084* (2013.01); *G06T 2207/20212* (2013.01)

(58) Field of Classification Search
    CPC ........ G01V 1/28; G06N 3/0455; G06N 3/048; G06N 3/045; G06N 3/08; G06N 3/0464; G06N 20/00; G06T 5/70; G06T 2207/20084; G06T 2207/20212; G06Q 10/0633; G06Q 50/02; E21B 44/005
    See application file for complete search history.

(56) References Cited

U.S. PATENT DOCUMENTS

| | | | |
|---|---|---|---|
| 2018/0137605 A1* | 5/2018 | Otsuka | G06T 5/70 |
| 2018/0150947 A1* | 5/2018 | Lu | G06T 11/001 |
| 2018/0164455 A1 | 6/2018 | Elboth et al. | |
| 2018/0203144 A1* | 7/2018 | Karrenbach | G01D 5/3538 |
| 2019/0302290 A1 | 10/2019 | Alwon | |
| 2020/0126186 A1* | 4/2020 | Kim | G06N 3/084 |
| 2021/0063594 A1* | 3/2021 | Wang | G01V 1/36 |
| 2021/0090289 A1* | 3/2021 | Karanam | G06T 7/337 |
| 2021/0104313 A1* | 4/2021 | Mizobe | G16H 50/20 |
| 2022/0012536 A1* | 1/2022 | Wang | G06V 30/19173 |
| 2022/0130136 A1* | 4/2022 | Ando | G16H 30/20 |
| 2022/0230022 A1* | 7/2022 | Park | B63B 43/18 |

OTHER PUBLICATIONS

Si, "Attenuation of random noise using denoising convolutional neural networks", Interpretation vol. 7, Issue 3, p. 1A-T725, Aug. 2019, 13 pages. available at: URL: https://www.researchgate.net/profile/Xu-Si-3/publication/335651063_Attenuation_of_random_noise_using_denoising_convolutional_neural_networks/links/5db405f84585155e270173a9/Attenuation-of-random-noise-using-denoising-convolutional-neural-networks.pdf.

Draganov et al., "Reflection images from ambient seismic noise", Geophysics, vol. 74, No. 5, pp. A63-A67, Sep.-Oct. 2009, available at: URL: https://citeseerx.ist.psu.edu/viewdoc/download?doi=10.1.1.699.6453&rep=rep1&type=pdf.

Greg Benz Photography—How to stack multiple images to reduce noise in starry night skies, available at: URL: https://www.youtube.com/watch?v=i0_oQ3je4gc>, Published on Feb. 8, 2017.

Search Report and Written Opinion of International Patent Application No. PCT/US2021/023415 on Jun. 15, 2021; 9 pages.

Extended Search Report issued in European Patent Application No. 21776200.4 dated Feb. 16, 2024, 6 pages.

Zhu, W. et al., Seismic Signal Denoising and Decomposition Using Deep Neural Networks, arXiv:1811.02695v1, Cornell University Library, New York, 14 pages.

Askari, R. et al., "Ground roll attenuation using the S and x-f-k transforms", Geophysical Prospecting, 2008, 56, pp. 105-114.

International Preliminary Report on Patentability of International Patent Application No. PCT/US2021/023415 dated Oct. 6, 2022, 6 pages.

\* cited by examiner

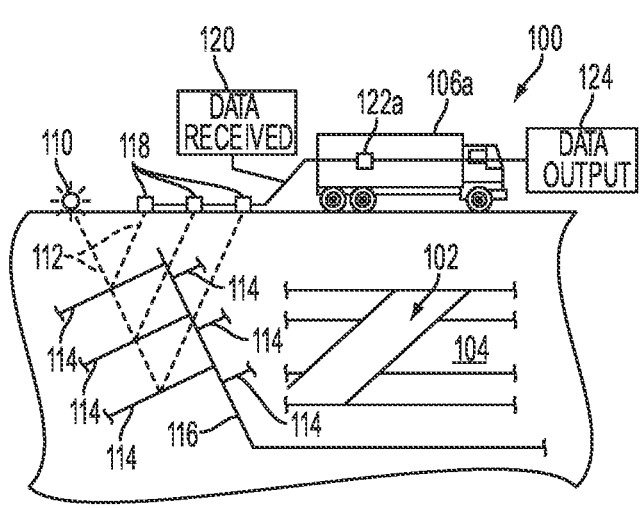
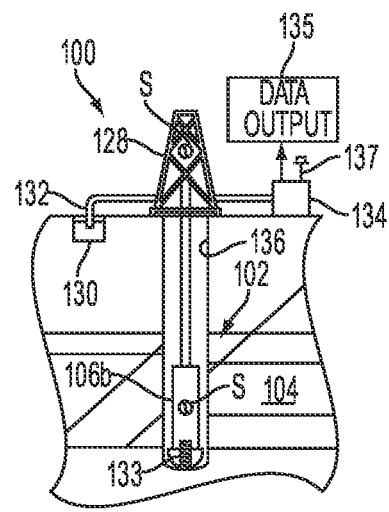
FIG. 1A  FIG. 1B
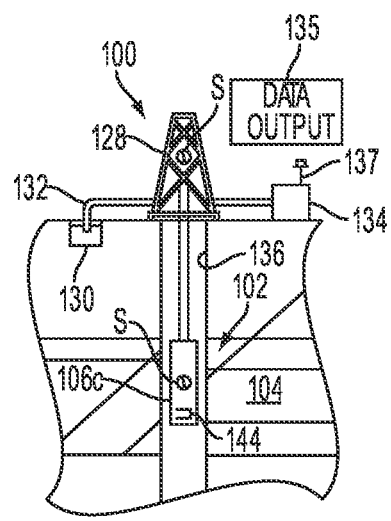
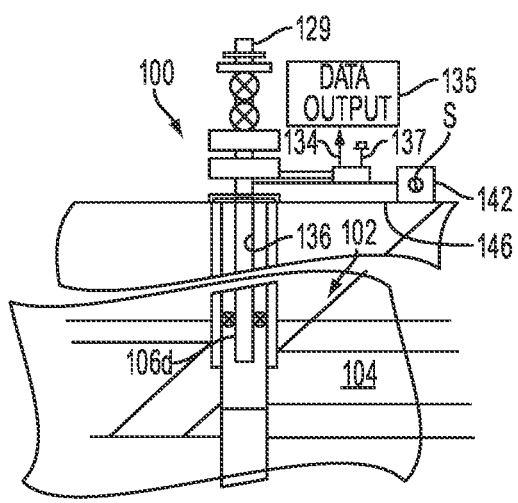
FIG. 1C  FIG. 1D

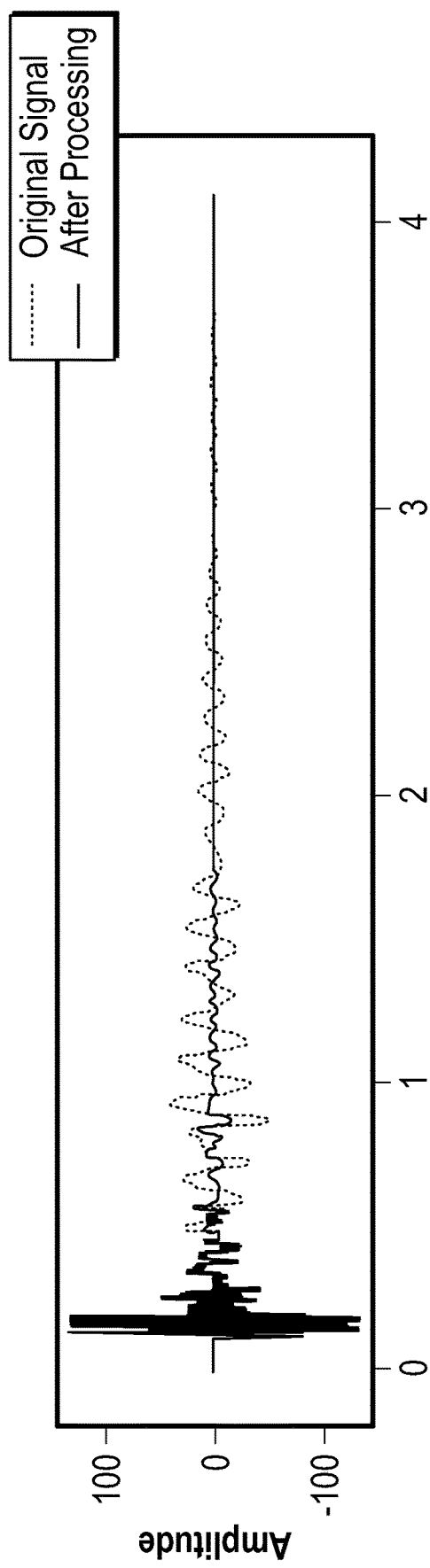
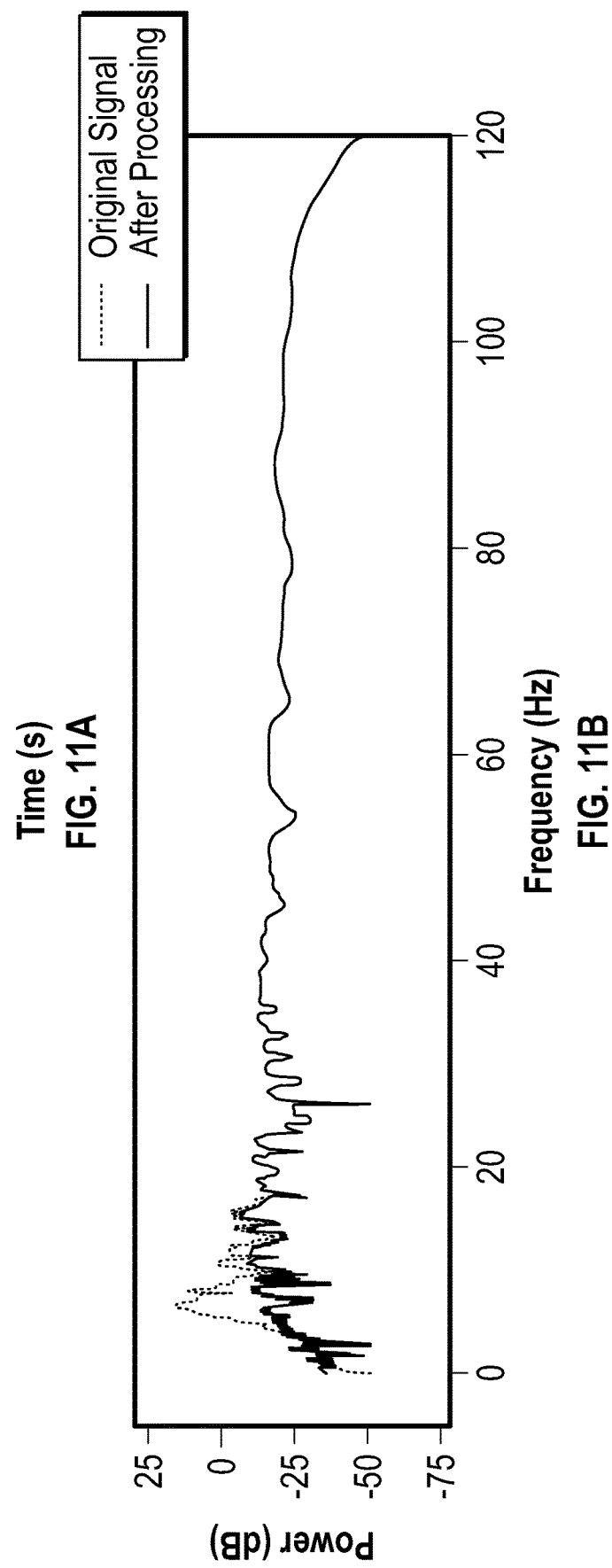
FIG. 11A
FIG. 11B

GROUND ROLL ATTENUATION USING UNSUPERVISED DEEP LEARNING

This application is a National Stage Entry of International Application No. PCT/US2021/023415, filed on Mar. 22, 2021, which claims the benefit of U.S. Provisional Patent Application No. 62/993,817, which was filed on Mar. 24, 2020 and is hereby incorporated by reference in its entirety.

BACKGROUND

In seismic data acquisition and processing, ground roll is associated with Rayleigh-type surface waves that occur in a zone of low velocity near a surface. Characteristics of ground roll signals include high amplitude, low velocity, dispersion, and energy concentration in low frequencies. Methods for attenuating such signals from seismic records may employ bandpass filtering, frequency-wavenumber (f-k) filtering, singular value decomposition (SVD) filtering, matching filtering, etc. These methods have been proved effective, but some challenges still remain. For example, frequency filtering methods may attenuate primary reflections present in a frequency band because of frequency overlap between the primary reflections. More advanced techniques may alleviate such bottlenecks, but such techniques may call for a workflow that is complex and time consuming.

Recently, some researchers have begun to apply deep learning techniques to ground roll attenuation. For instance, a convolutional neural network (CNN) may be designed for suppressing scattered ground roll noise. A cycle generative adversarial network (CycleGAN) may also be used for ground roll attenuation. Both methods belong to the supervised learning approach, where reflections without ground roll signals are taken as labels in a training stage. However, collecting proper labels for field data denoising is challenging because numerically simulated labels may bias output of a trained network to be synthetic, and labels processed from field data may not always be available.

SUMMARY

According to one aspect of the present invention, a machine-implemented method is provided for attenuating noise via unsupervised machine learning. A computing system receives a seismic image. The computing system generates a first image using a first neural network configured to identify low frequency noise in the seismic image and generates a second image using a second neural network configured to identify reflections in the seismic image and to attenuate the low frequency noise. The first image and the second image are combined to generate a combined image. The computing system then adjusts the first neural network and the second neural network to reduce a difference between the combined image and the seismic image in a time domain using frequency constraint as a regularization of a loss function.

In a second aspect of the present invention, at least one non-transitory computer-readable medium is provided that stores instructions. When the instructions are executed by at least one processor of a computing system, the computing system performs a number of operations. According to the operations, a seismic image is received. A first image is generated using a first neural network configured to identify low frequency noise, including ground roll, in the seismic image. A second image is generated using a second neural network configured to identify reflections in the seismic image and to attenuate the low frequency noise. The first image and the second image are combined to generate a combined image. The first neural network and the second neural network are adjusted to reduce a difference between the combined image and the seismic image in a time domain using frequency constraint as a regularization of a loss function.

In a third aspect of the present invention, a computing system is provided for attenuating low-frequency ground roll via unsupervised machine learning. The computing system includes one or more processors and a memory. The memory includes one or more non-transitory computer-readable media that stores instructions. When the one or more processors execute the instructions, the computing system is caused to perform a number of operations. According to the operations, a seismic image is received. A first image is generated using a first neural network configured to identify the low-frequency ground roll in the seismic image. A second image is generated using a second neural network configured to identify reflections in the seismic image. The first image and the second image are combined to generate a combined image. The first neural network and the second neural network are adjusted to reduce a difference between the combined image and the seismic image in a time domain using frequency constraint as a regularization of a loss function.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIGS. 1A, 1B, 1C, 1D, 2, 3A, and 3B illustrate simplified, schematic views of an oilfield and its operation, according to an embodiment.

FIG. 9A illustrates seismic data for training and FIG. 9B illustrates a mask generated in a first stage of the method, according to an embodiment.

FIG. 10A illustrates original seismic data; FIG. 10B illustrates extracted ground roll signals; and FIG. 10C illustrates a result of ground roll attenuation, according to an embodiment.

FIGS. 11A and 11B illustrate time and frequency domain of a curve, with FIG. 11A illustrating a time series and FIG. 11B illustrating a power spectrum of the time series, according to an embodiment.

DETAILED DESCRIPTION OF EMBODIMENTS

Figure 2:
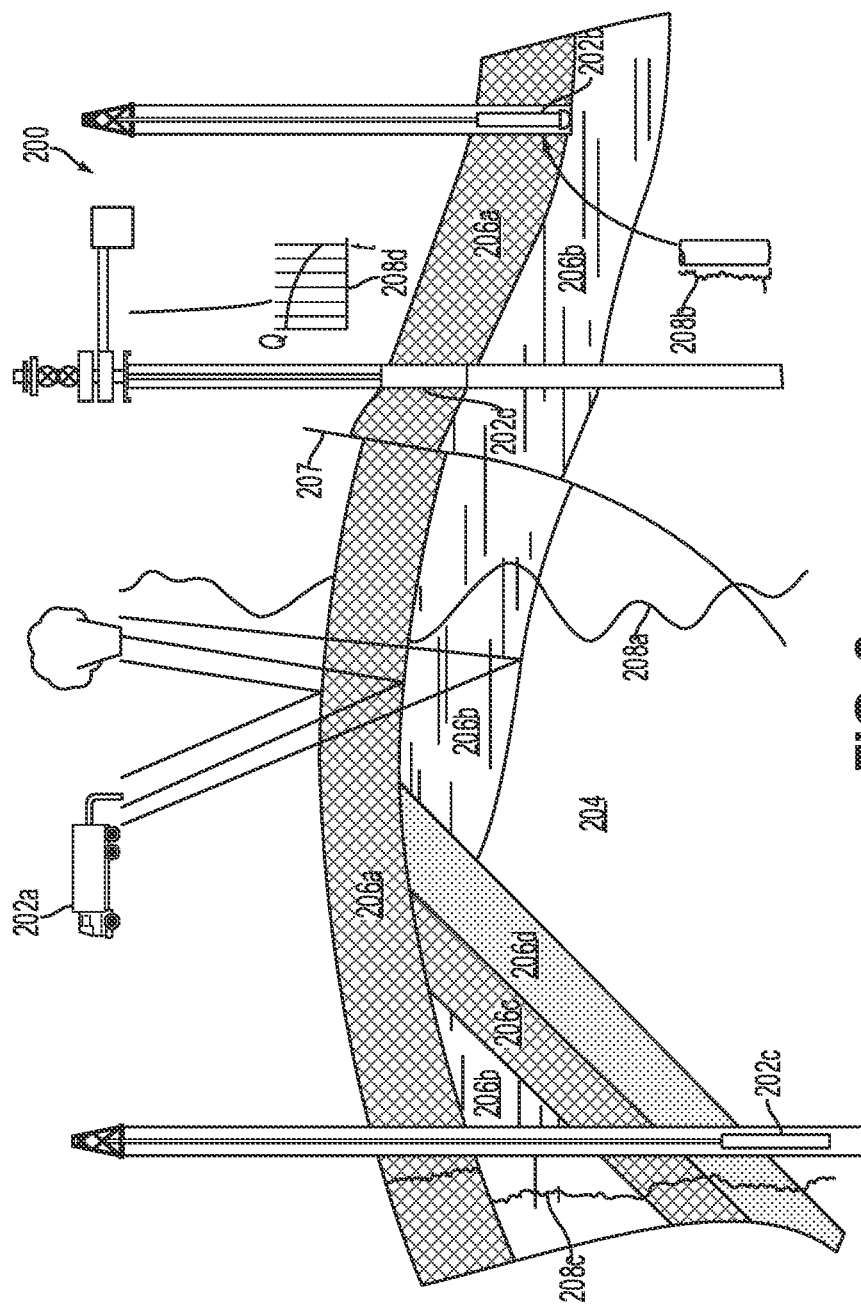

Embodiments of the disclosure may apply an unsupervised deep learning method to low frequency noise attenuation such as, for example, seismic ground roll attenuation. Some embodiments may include at least two stages: a first stage to separate a no-signal part and a signal part (before and after first arrival of signals) with a convolutional encoder-decoder network, and a second stage to separate the low frequency noise, including ground roll, and reflections with a two-dimensional (2D) convolutional neural network (CNN) that includes two sub-CNNs. A difference in spectrum distribution between ground rolls and reflections may be included in a criterion of unsupervised separation. Test results for an experimental embodiment show that various embodiments are computationally efficient and may suppress power spectra of ground roll while preserving low frequency components of reflections.

Reference will now be made in detail to embodiments, examples of which are illustrated in the accompanying drawings and Figs. In the following detailed description, numerous specific details are set forth in order to provide a thorough understanding of the embodiments. However, it will be apparent to one of ordinary skill in the art that the embodiments may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the invention. The first object and the second object are both objects, respectively, but they are not to be considered the same object.

The terminology used in the description of the embodiments herein is for describing particular embodiments only and is not intended to be limiting of the embodiments. As used in the description and the appended claims, the singular forms "a," "an" and "the" are intended to include plural forms as well, unless context clearly indicates otherwise. It will also be understood that the term "and/or" as used herein refers to and encompasses any possible combinations of one or more of associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques and workflows that are in accordance with some embodiments. Some operations in the processing procedures, methods, techniques and workflows disclosed herein may be combined and/or an order of some of the operations may be changed.

FIGS. 1A-1D illustrate simplified, schematic views of an oilfield 100 having a subterranean formation 102 containing reservoir 104 therein in accordance with implementations of various technologies and techniques described herein. FIG. 1A illustrates a survey operation being performed by a survey tool, such as seismic truck 106*a*, to measure properties of subterranean formations 102. The survey operation is a seismic survey operation for producing sound vibrations. In FIG. 1A, one such sound vibration, e.g., sound vibration 112 generated by source 110, reflects off horizons 114 in earth formation 116. A set of sound vibrations is received by sensors, including but not limited to geophone-receivers 118, situated on a surface of earth. Data received 120 may be provided as input data to a computer 122*a* of seismic truck 106*a*, and responsive to data received 120, computer 122*a* may generate seismic data output 124. Seismic data output 124 may be stored, transmitted or further processed as desired, for example, by data reduction.

FIG. 1B illustrates a drilling operation being performed by drilling tools 106*b* suspended by a rig 128 and advanced into subterranean formations 102 to form a wellbore 136. A mud pit 130 may be used to draw drilling mud into drilling tools 106*b* via a flow line 132 for circulating the drilling mud down through drilling tools 106*b*, then up wellbore 136 and back to the surface. Typically, the drilling mud is filtered and returned to the mud pit. A circulating system may be used for storing, controlling, or filtering the flowing drilling mud. Drilling tools 106*b* may be advanced into subterranean formations 102 to reach reservoir 104. Each well may target one or more reservoirs. Drilling tools 106*b* are adapted for measuring downhole properties using logging while drilling tools. The logging while drilling tools also may be adapted for taking a core sample 133 as shown.

Computer facilities may be positioned at various locations about oilfield 100 (e.g., surface unit 134) and/or at remote locations. A surface unit 134 may be used to communicate with drilling tools 106*b* and/or offsite operations, as well as with other surface or downhole sensors. Surface unit 134 may be capable of communicating with drilling tools 106*b* to send commands to drilling tools 106*b*, and to receive data therefrom. Surface unit 134 may also collect data generated during the drilling operation and produce a data output 135, which then may be stored or transmitted.

Sensors (S), such as gauges, may be positioned about oilfield 100 to collect data relating to various oilfield operations as described previously. As shown, sensor (S) is positioned in one or more locations in drilling tools 106*b* and/or at rig 128 to measure drilling parameters including, but not limited to weight on bit, torque on bit, pressures, temperatures, flow rates, compositions, rotary speed, and/or other parameters of the oilfield operation. Sensors (S) may also be positioned in one or more locations in a circulating system.

Drilling tools 106*b* may include a bottom hole assembly (BHA) (not shown), generally referenced, near a drill bit (e.g., within several drill collar lengths from the drill bit). The bottom hole assembly includes capabilities for measuring, processing, and storing information, as well as communicating with surface unit 134. The bottom hole assembly further may include drill collars for performing various other measurement functions.

The bottom hole assembly may include a communication subassembly that communicates with surface unit 134. The communication subassembly may be adapted to send signals to and receive signals from the surface using a communications channel including, but not limited to mud pulse telemetry, electro-magnetic telemetry, or wired drill pipe communications. The communication subassembly may include, for example, a transmitter that generates a signal, such as an acoustic or electromagnetic signal, which is representative of measured drilling parameters. It will be appreciated by one of skill in the art that a variety of telemetry systems may be employed, including, but not limited to wired drill pipe, electromagnetic or other known telemetry systems.

Typically, a wellbore is drilled according to a drilling plan that is established prior to drilling. The drilling plan typically sets forth equipment, pressures, trajectories and/or other parameters that define a drilling process for the wellsite. A drilling operation may then be performed according to the drilling plan. However, as information is gathered, the drilling operation may need to deviate from the drilling plan. Additionally, as the drilling operation or other operations are performed, subsurface conditions may change. As new information is collected, an earth model may be adjusted.

Data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real-time data, or combinations thereof. The real-time data may be used in real time, or stored for later use. The data also may be combined with historical data or other inputs for further analysis. The data may be stored in separate databases, or combined into a single database.

Surface unit 134 may include transceiver 137 to allow communications between surface unit 134 and various portions of oilfield 100 or other locations. Surface unit 134 also may be provided with or functionally connected to one or more controllers (not shown) for actuating mechanisms at oilfield 100. Surface unit 134 then may send command signals to oilfield 100 in response to data received. Surface unit 134 may receive commands via transceiver 137 or may itself execute commands to the controller. A processor may be provided to analyze the data (locally or remotely), make decisions and/or actuate the controller. In this manner, oilfield 100 may be selectively adjusted based on the data collected. This technique may be used to optimize (or improve) portions of the oilfield operation, such as controlling drilling, weight on bit, pump rates, or other parameters. Adjustments may be made automatically based on computer protocol, and/or manually by an operator. In some cases, well plans may be adjusted to select optimum (or improved) operating conditions, or to avoid problems.

FIG. 1C illustrates a wireline operation being performed by wireline tool 106c suspended by rig 128 and into wellbore 136 of FIG. 1C. Wireline tool 106c may be adapted for deployment into wellbore 136 for generating well logs, performing downhole tests and/or collecting samples. Wireline tool 106c may be used to provide another method and apparatus for performing a seismic survey operation. Wireline tool 106c may, for example, have an explosive, radioactive, electrical, or acoustic energy source 144 that sends and/or receives electrical signals to surrounding subterranean formations 102 and fluids therein.

Wireline tool 106c may be operatively connected to, for example, geophones 118 or other sensing devices and computer 122a of a seismic truck 106a of FIG. 1A. Wireline tool 106c may also provide data to surface unit 134. Surface unit 134 may collect data generated during the wireline operation and may produce data output 135 that may be stored or transmitted. Wireline tool 106c may be positioned at various depths in wellbore 136 to provide a survey or other information relating to subterranean formations 102.

Sensors (S), such as gauges, may be positioned about oilfield 100 to collect data relating to various oilfield operations as described previously. As shown, sensor S is positioned in wireline tool 106c to measure downhole parameters which relate to, for example porosity, permeability, fluid composition and/or other parameters of the oilfield operation.

FIG. 1D illustrates a production operation being performed by production tool 106d deployed from a production unit or Christmas tree 129 and into completed wellbore 136 for drawing fluid from the downhole reservoirs into surface facilities 142. The fluid may flow from reservoir 104 through perforations in a casing (not shown) and into production tool 106d in wellbore 136 and to surface facilities 142 via a gathering network 146.

Sensors (S), such as gauges, may be positioned about oilfield 100 to collect data relating to various oilfield operations as described previously. As shown, sensor (S) may be positioned in production tool 106d or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more wellsites for selectively collecting downhole fluids from the wellsite(s).

While FIGS. 1B-1D illustrate tools used to measure properties of an oilfield, it will be appreciated that the tools may be used in connection with non-oilfield operations, such as gas fields, mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formations and/or their geological formations may be used. Various sensors (S) may be located at various positions along the wellbore and/or the monitoring tools to collect and/or monitor the desired data. Other sources of data may also be provided from offsite locations.

The field configurations of FIGS. 1A-1D are intended to provide a brief description of an example of a field usable with oilfield application frameworks. Part of, or the entirety, of oilfield 100 may be on land, water and/or sea. Also, while a single field measured at a single location is depicted, oilfield applications may be utilized with any combination of one or more oilfields, one or more processing facilities and one or more wellsites.

FIG. 2 illustrates a schematic view, partially in cross section of oilfield 200 having data acquisition tools 202a, 202b, 202c and 202d positioned at various locations along oilfield 200 for collecting data of subterranean formation 204 in accordance with implementations of various technologies and techniques described herein. Data acquisition tools 202a-202d may be the same as data acquisition tools 106a-106d of FIGS. 1A-1D, respectively, or others not depicted. As shown, data acquisition tools 202a-202d may generate data plots or measurements 208a-208d, respectively. These data plots are depicted along oilfield 200 to demonstrate data generated by various operations.

Data plots 208a-208c are examples of static data plots that may be generated by data acquisition tools 202a-202c, respectively; however, it should be understood that data plots 208a-208c may be updated in real time. These measurements may be analyzed to better define properties of the formation(s) and/or determine an accuracy of the measurements and/or for checking for errors. The plots of each of the respective measurements may be aligned and scaled for comparison and verification of the properties.

Static data plot 208a is a seismic two-way response over a period of time. Static plot 208b is core sample data measured from a core sample of formation 204. The core sample may be used to provide data, such as a graph of density, porosity, permeability, or some other physical property of the core sample over a length of the core. Tests for density and viscosity may be performed on fluids in the core at varying pressures and temperatures. Static data plot 208.c is a logging trace that typically provides a resistivity or other measurement of the formation at various depths.

A production decline curve or graph 208d is a dynamic data plot of fluid flow rate over time. The production decline curve typically provides a production rate as a function of time. As the fluid flows through the wellbore, measurements may be taken of fluid properties, such as flow rates, pressures, composition, etc.

Other data also may be collected, such as historical data, user inputs, economic information, and/or other measurement data and other parameters of interest. As described below, static and dynamic measurements may be analyzed and used to generate models of the subterranean formation to determine characteristics thereof. Similar measurements may also be used to measure changes in formation aspects over time.

A subterranean structure may have multiple geological formations 206a-206d. As shown, this structure may have several formations or layers, including a first shale layer 206a, a carbonate layer 206b, a second shale layer 206c and a sand layer 206d. A fault 207 may extend through first shale layer 206a and carbonate layer 206b. The static data acquisition tools may be adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, typically below a water line, fluid may occupy pore spaces of the formations. Each of the measurement devices may be used to measure properties of the formations and/or their geological features. While each acquisition tool is shown as being in specific locations in oilfield 200, it will be appreciated that one or more types of measurement may be taken at one or more locations across one or more oilfields or other locations for comparison and/or analysis.

The data collected from various sources, such as the data acquisition tools of FIG. 2, may be processed and/or evaluated. Typically, seismic data displayed in static data plot 208a from data acquisition tool 202a may be used by a geophysicist to determine characteristics of the subterranean formations and features. The core data shown in static plot 208b and/or log data from a well log 208c are typically used by a geologist to determine various characteristics of a subterranean formation. The production data from graph 208d is typically used by a reservoir engineer to determine fluid flow reservoir characteristics. The data analyzed by the geologist, geophysicist and the reservoir engineer may be analyzed using modeling techniques.

Figure 3A:
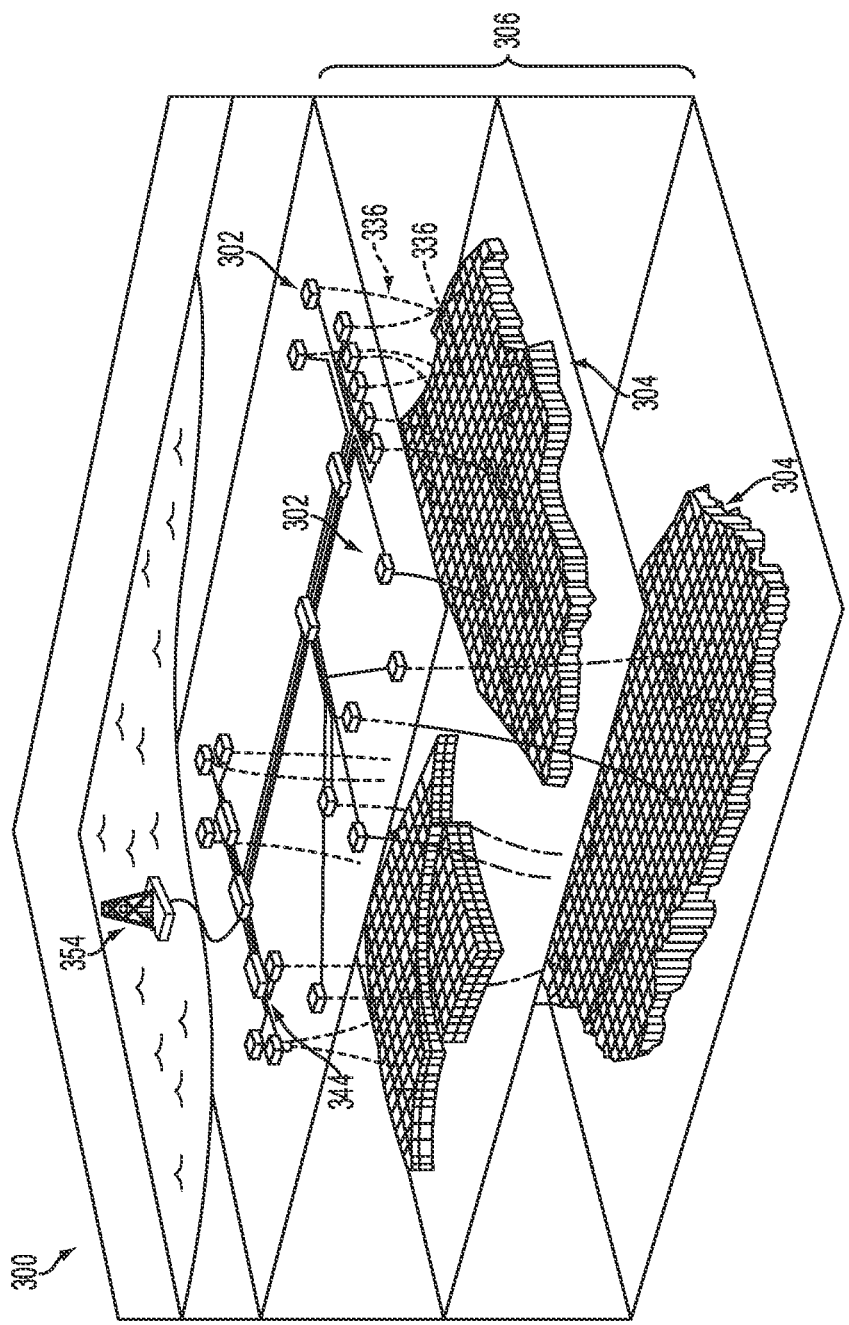

FIG. 3A illustrates an oilfield 300 for performing production operations in accordance with implementations of various technologies and techniques described herein. As shown, oilfield 300 has multiple wellsites 302 operatively connected to a central processing facility 354. A configuration of oilfield 300 is not intended to limit a scope of an oilfield application system. Part, or all, of an oilfield may be on land and/or sea. Also, while a single oilfield with a single processing facility and multiple wellsites is depicted in FIG. 3A, any combination of one or more oilfields, one or more processing facilities and one or more wellsites may be present.

Each wellsite 302 has equipment that forms wellbore 336 into the earth. Wellbores 336 extend through subterranean formations 306 including reservoirs 304. Reservoirs 304 contain fluids, such as hydrocarbons. Wellsites 302 may draw fluid from reservoirs 304 and may pass the fluid to processing facilities via surface networks 344. Surface networks 344 may have tubing and control mechanisms for controlling a flow of fluids from wellsites 302 to processing facility 354.

Figure 3B:
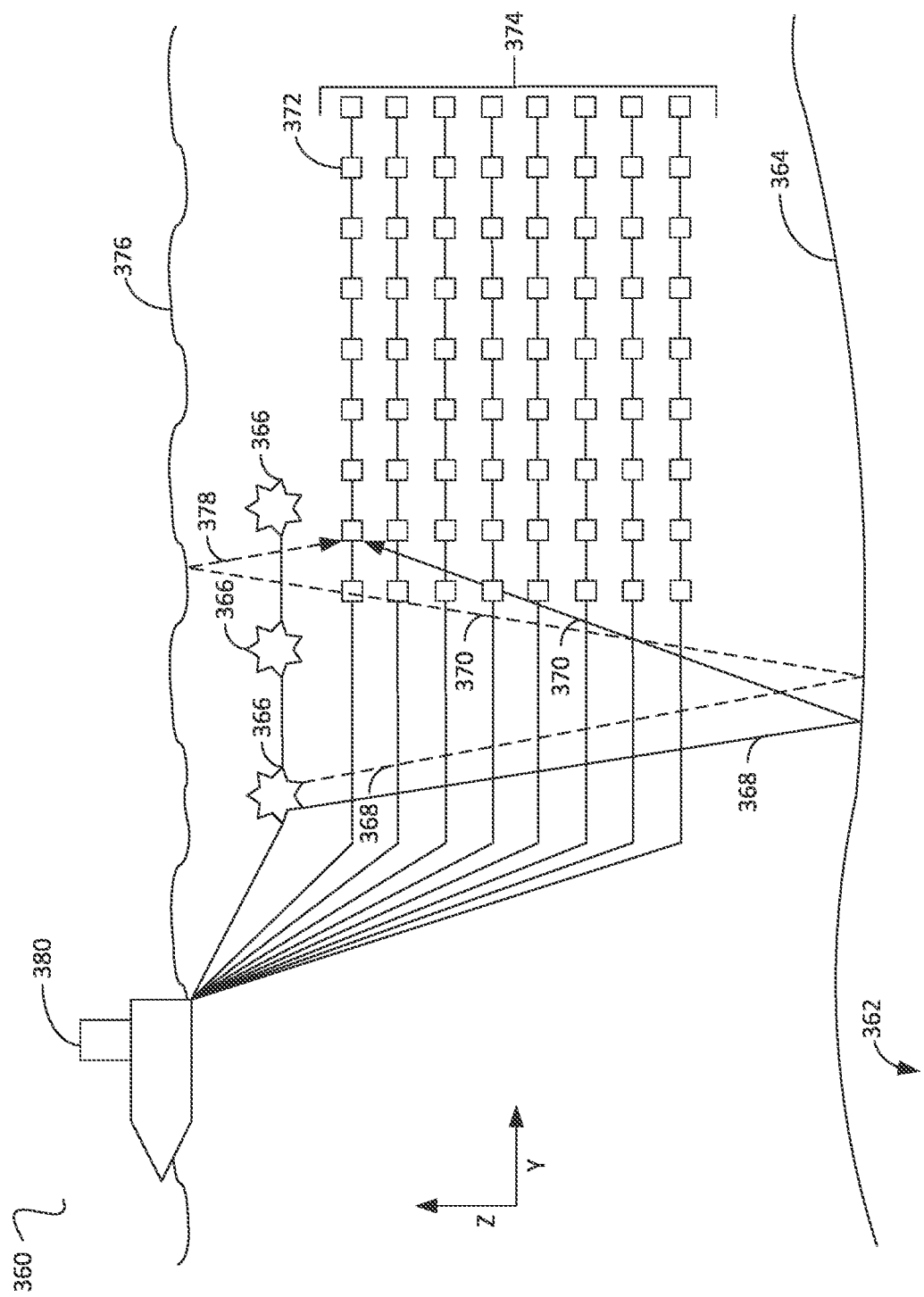

Attention is now directed to FIG. 3B, which illustrates a side view of a marine-based survey 360 of a subterranean subsurface 362 in accordance with one or more implementations of various techniques described herein. Subsurface 362 includes seafloor surface 364. Seismic sources 366 may include marine sources such as vibroseis, airguns, or other marine sources, which may propagate seismic waves 368 (e.g., energy signals) into the earth over an extended period of time or at a nearly instantaneous energy provided by impulsive sources. Seismic waves 368 may be propagated by marine sources as a frequency sweep signal. For example, marine sources of the vibroseis type may initially emit a seismic wave at a low frequency (e.g., 5 Hz) and may increase the seismic wave to a high frequency (e.g., 80-90 Hz) over time.

Component(s) of seismic waves 368 may be reflected and converted by seafloor surface 364 (i.e., reflector), and seismic wave reflections 370 may be received by multiple seismic receivers 372. Seismic receivers 372 may be disposed on multiple streamers (i.e., a streamer array 374). Seismic receivers 372 may generate electrical signals representative of received seismic wave reflections 370. The electrical signals may be embedded with information regarding subsurface 362 captured as a record of seismic data.

In one implementation, each streamer may include streamer steering devices such as a bird, a deflector, a tail buoy and the like, which are not illustrated in this application. The streamer steering devices may be used to control the position of the streamers in accordance with the techniques described herein.

In one implementation, seismic wave reflections 370 may travel upward and reach a water/air interface at a water surface 376, a portion of reflections 370 may reflect downward again (i.e., sea-surface ghost waves 378) and be received by multiple seismic receivers 372. Sea-surface ghost waves 378 may be referred to as surface multiples. A point on the water surface 376 at which the wave is reflected downward is generally referred to as a downward reflection point.

The electrical signals may be transmitted to a vessel 380 via transmission cables, wireless communication or the like. Vessel 380 then may transmit the electrical signals to a data processing center. Alternatively, vessel 380 may include an onboard computer capable of processing the electrical signals (i.e., seismic data). Those skilled in the art having the benefit of this disclosure will appreciate that this illustration is highly idealized. For instance, surveys may be of formations deep beneath the surface. The formations may typically include multiple reflectors, some of which may include dipping events, and may generate multiple reflections (including wave conversion) for receipt by seismic receivers 372. In one implementation, the seismic data may be processed to generate a seismic image of the subsurface 362.

Marine seismic acquisition systems tow each streamer in streamer array 374 at a same depth (e.g., 5-10 m). However, marine based survey 360 may tow each streamer in streamer array 374 at different depths such that seismic data may be acquired and processed in a manner that avoids the effects of destructive interference due to sea-surface ghost waves. For instance, marine-based survey 360 of FIG. 3B illustrates eight streamers towed by vessel 380 at eight different depths. The depth of each streamer may be controlled and maintained using the birds disposed on each streamer.

Ground Roll Attenuation Method

In some embodiments, a method is provided that uses an unsupervised deep learning technique for ground roll attenuation. For example, a two-dimensional (2D) convolutional neural network (CNN) for separating ground rolls and reflections may be implemented. In a training stage, inputs and labels of the CNN are the same 2D shot gathers. The CNN includes, e.g., two, sub-networks: one for outputting low-frequency noise such as, for example, ground roll, and another for outputting reflection. During training, the CNN may be configured to reduce a residual between a summation of the two sub-networks and the 2D shot gathers in time domain. Frequency constraint is used as a regularization of a loss function to guide the separating. Further, to reduce or eliminate effects of random noise before first arrival, a 2D convolutional encoder-decoder may be used to generate a binary mask for each shot gather.

In some embodiments, the method may include generating a binary mask for the individual shot gathers. In an area before first arrival, a value is 1; otherwise, the value is 0. The mask may be used as an input to the CNN for low-frequency noise such as, for example, ground roll, and reflection separation, so that the overfitting of the random noise before first arrival could be avoided.

Figure 4:
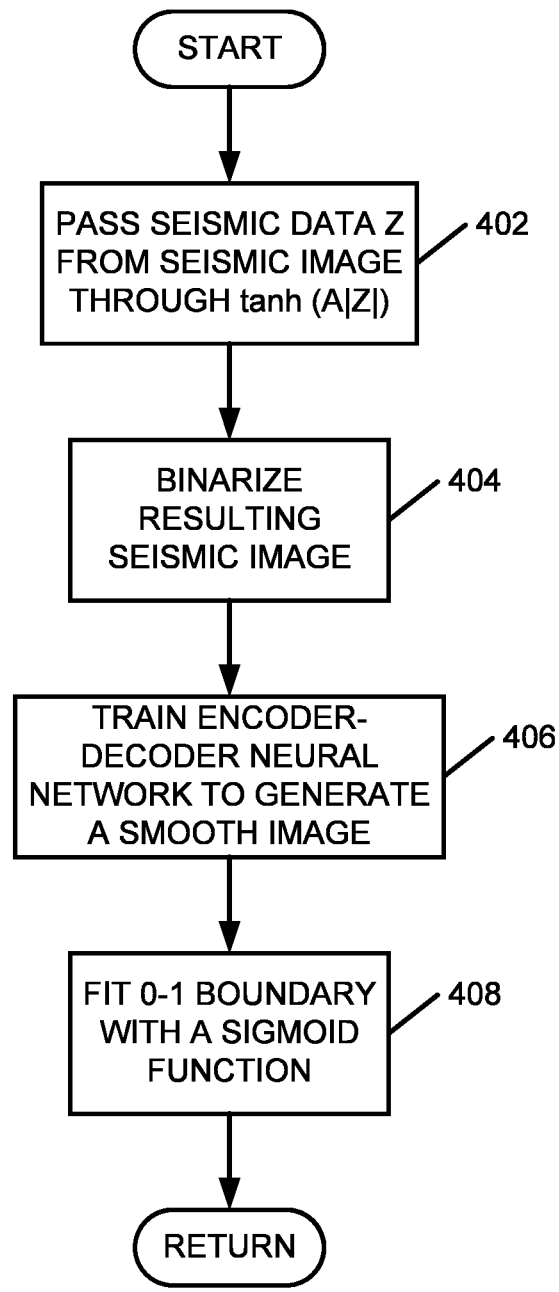
FIG. 4 is a flowchart of an example process for generating a binary mask for a seismic image, according to an embodiment.

FIG. 4 is a flowchart that illustrates an example process for generating the binary mask. The process of generating a mask may include three parts. First, a seismic image may be converted to a binary image, e.g., "binarize" the seismic image. In some embodiments, seismic data z from the seismic image may be processed according to t=tanh(A|z|) (act 402) and then binarized with a cutoff of 0.5 (act 404). The term, A, is an amplifier coefficient that may be set to, for example, 50 in some embodiments. Next, an encoder-decoder neural network may be trained to generate a smooth image (act 406). In the training, inputs and labels may be the binary images generated above. During prediction, input is a binary image and output is a smooth image.

Figure 5:
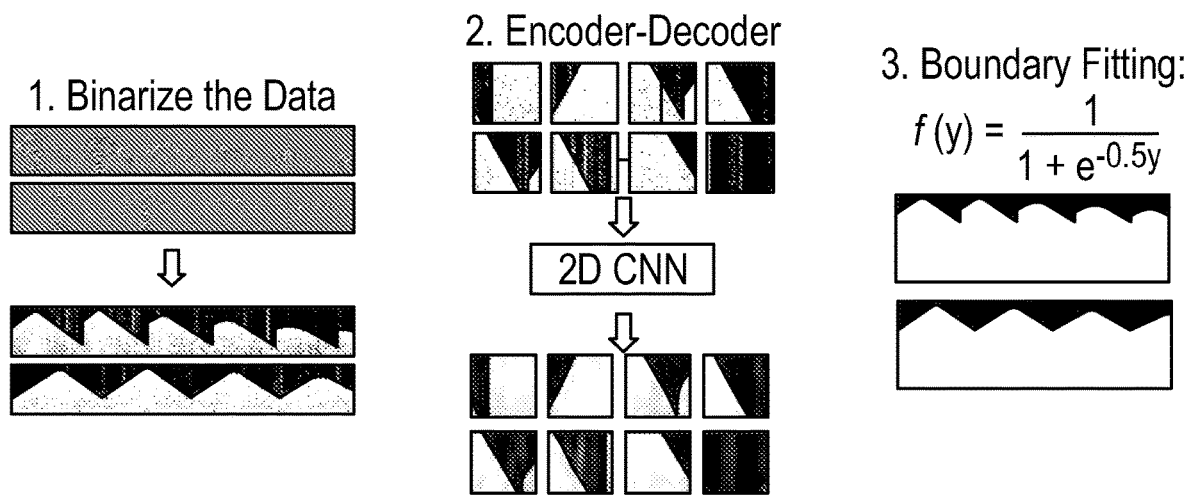
FIG. 5 illustrates three steps for generating a binary mask for a seismic image, according to an embodiment.

In a vertical direction of the output above, a 0-1 boundary may be fitted using a sigmoid function (act 408) such as, for example:

$$f(y) = \frac{1}{1+e^{-ay}} \quad (1)$$

where a is a positive factor to adjust the smoothness of the 0-1 boundary. In some embodiments, $\alpha=0.5$. Although, a different value for $\alpha$ may be used in other embodiments. FIG. 5 illustrates the process of generating a mask including steps of binarizing seismic data, passing the binarized data through an encoder-decoder to generate a smooth image, and fitting the 0-1 boundary by using a sigmoid function.

Figure 6:
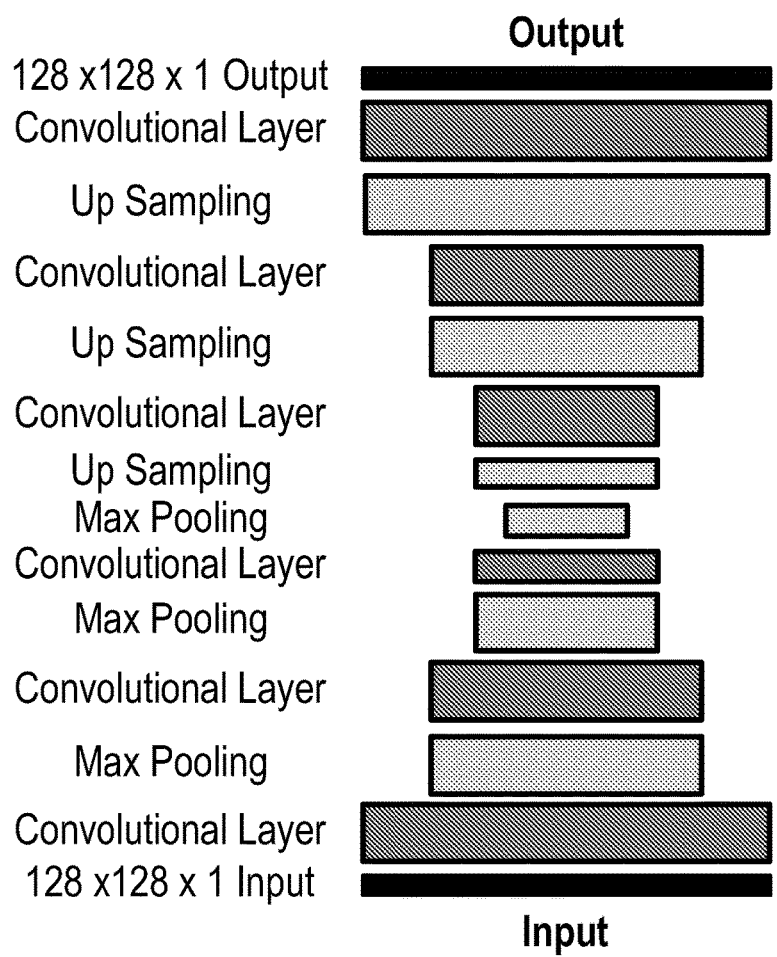
FIG. 6 illustrates an architecture of an encoder-decoder for generating a binary mask for a seismic image, according to an embodiment.

A fully convolutional neural network may be used for the encoder-decoder. While the input is speckled images, the encoder-decoder can filter a high frequency of the image and output a smooth image that contains main features of the input. An example architecture of the encoder-decoder is shown in FIG. 6. The example architecture of FIG. 6 has six convolutional layers in total, in this embodiment. A max pooling method may be used after each convolutional layer in an encoder part and a nearest-neighbor interpolation method may be used before each convolutional layer in a decoder part. A relu activation may be used to add nonlinearity. A size of the training patches may be 128×128, but a size of input for the prediction can be different.

Although FIG. 6 shows an architecture with six convolutional layers, other embodiments may include additional or fewer convolutional layers. Further, some embodiments may use an average pooling method after each convolutional layer in the encoder part and a different up sampling method in the decoder part.

Figure 7:
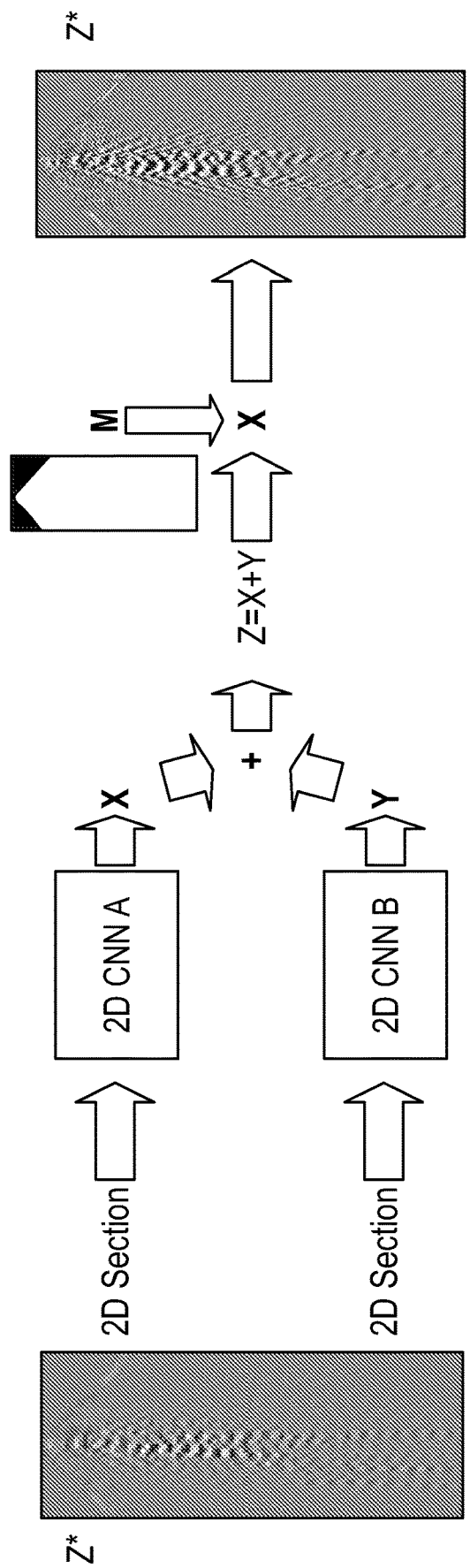
FIG. 7 illustrates an architecture of a neural network for ground roll and reflection separation, according to an embodiment.

An example architecture shown in FIG. 7 may be applied to attenuate low-frequency noise such as, for example, ground roll. In FIG. 7, a CNN may include two 2D sub-networks: CNN A and CNN B. Training inputs and labels for both sub-networks may be the same seismic data with ground rolls. In embodiments that generate a binary mask, the binary mask may be applied to the seismic data before the seismic data passes through the two sub-networks. After the seismic data passes through the two sub-networks, one sub-network may generate the low-frequency noise, including ground roll, and another sub-network may generate reflection, with a summation of outputs of the two sub-networks and noise eliminated by the binary mask equaling original seismic data. However, since numerous ways exist to separate the original data into two parts, and a true label of either separated part may not be readily available, a constraint to the two neural sub-networks may be imposed so that the two neural sub-networks can correctly separate the low-frequency noise, including ground roll, and reflection.

The seismic data may have large oscillations, which makes a correlation between gradients of images unreliable or failure-prone as a criterion for image separation. Frequency constraint may thus be used to guide the separation, considering a low frequency characteristic of ground roll signals. A loss function may be written as $$L_{total}=L_{data}+\lambda_1 L_{low}+\lambda_2 L_{high} \quad (2)$$

where the $L_{total}$ is total data loss, the $L_{data}$ is data loss, the $L_{low}$ and the $L_{high}$ are the regularization terms to impose frequency constraint, and $\lambda_1$ and $\lambda_2$ are corresponding coefficients.

The data loss may be defined as $$L_{data} = \frac{1}{N}\|M \otimes Z - Z^*\|_F^2 \quad (3)$$

where the M is the mask generated in the first stage, the Z is the summation of the output of CNN A and CNN B (shown in FIG. 7), the Z* is the original seismic data, N is a number of the discrete 2D data sections included in a patch, $\|\cdot\|_F$ is a Frobenius norm, and $\otimes$ denotes element-wise multiplication.

As shown in FIG. 7, a set of 2D sections are provided as input to the CNN A and the CNN B. During training, the set of sections typically are divided into training patches, wherein the N is a number of 2D sections included in a training patch.

The 2D Fourier transform of X and Y may be denoted as $$X(f_x, f_y) = F(X) \quad (4)$$

$$Y(f_x, f_y) = F(Y) \quad (5)$$

where $F(\cdot)$ is the 2D Fourier transform function, $f_x$ and $f_y$ are the discrete frequency domain along horizontal and vertical direction with $f_x=1, \ldots, P$ and $f_y=1, \ldots, Q$. For training convenience, only the spectra of the X and Y is penalized along the vertical direction (in the $f_y$ domain).

The regularization that penalizes the low frequency component is written as $$L_{low} = \frac{1}{WP} \sum_{f_y=0}^{W} |X(f_x, f_y)| \quad (6)$$

where W is a predefined number representing the window size in the frequency domain, WP is the number of pixels for computing the mean value of the summation. Minimizing $L_{low}$ may minimize the low frequency component in X. However, since preserving the reflections' low frequency components may be desired, the regularization coefficient $\lambda_1$ may be small.

Similarly, the regularization that penalizes the high frequency component is written as $$L_{high} = \frac{1}{N-WP} \sum_{f_y=W+1}^{Q} |Y(f_x, f_y)| \quad (7)$$

Minimizing $L_{high}$ may minimize the high frequency component in Y. Therefore, the output Y would represent ground roll signals. In the prediction stage, Z*−Y is a result of ground roll attenuation.

The parameters W, $\lambda_1$ and $\lambda_2$ may be trade-off parameters. For example, W may be set to 60 (corresponding to 15 Hz), $\lambda_1$ may be set to 0.0009 and $\lambda_2$ may be set to 0.0025.

Figure 8:
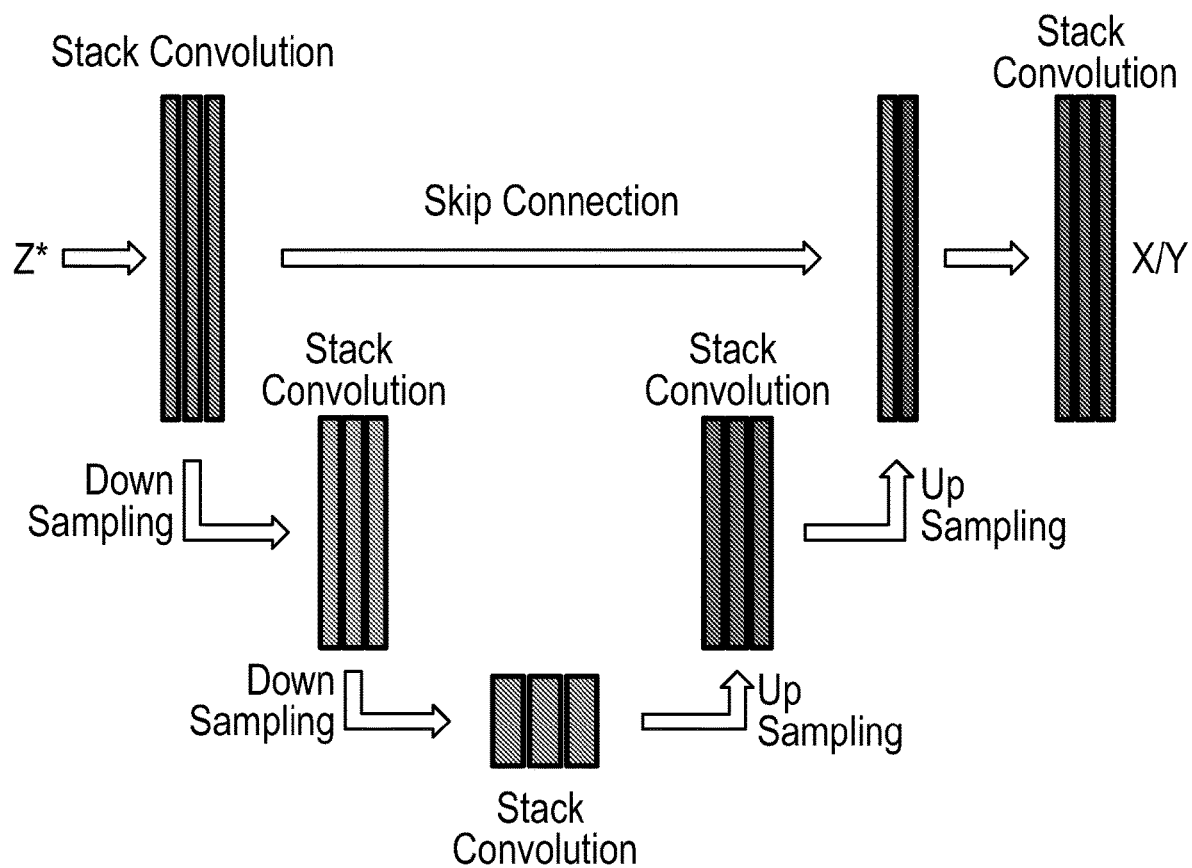
FIG. 8 illustrates an architecture for a single convolutional neural network in ground roll and reflection separation, according to an embodiment.

An example architecture of CNN A/B is shown in FIG. 8. In CNN A, which outputs high frequency signals, a number of layers in each stack convolution may be 3; in CNN B, which outputs low frequency signals, 2-layer stack convolution may be used. In both networks, a skip connection from an output of the first stack convolution to an input of the last stack convolution may be added. Compared with a convolutional neural network without a skip connection, the skip connection brings faster convergence during training and better performance regarding preservation of data precision in test cases.

In an embodiment, max pooling and a nearest-neighbor interpolation method may be used for down sampling and up sampling, respectively, and a rectified linear activation function (relu) may be used after each convolutional layer except an output layer. In another embodiment, average pooling may be used for down sampling and a different method may be used for up sampling.

During training and prediction, the input Z* may be normalized with standard normalization, i.e.

$$Z_i^* = \frac{1}{s}(Z_i^0 - \overline{Z_i^0}) \quad (8)$$

where the $Z_i^0$ is seismic data before normalization, the $\overline{Z_i^0}$ and the s are a mean value and standard deviation of the $Z_i^0$, respectively. In some embodiments, training may be achieved by using an Adam optimizer with an exponential decay learning rate.

EXAMPLES

Figure 9A:
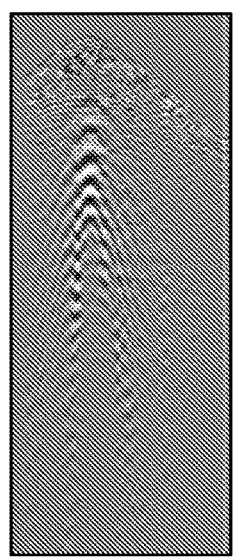
FIGS. 9A and 9B illustrate an example training patch and a corresponding mask. In particular.
Figure 9B:
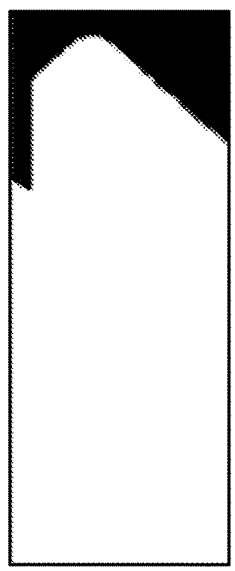

In an experimental example, 3D land shot gathers contaminated with ground rolls were used as a training set. A size of training patches was 2048×80, with a record time ranging from 0 to 4.096 seconds. Before training, masks were generated in a first stage. FIG. 9A shows one of the training patches and FIG. 9B shows its corresponding mask.

Figure 10A:
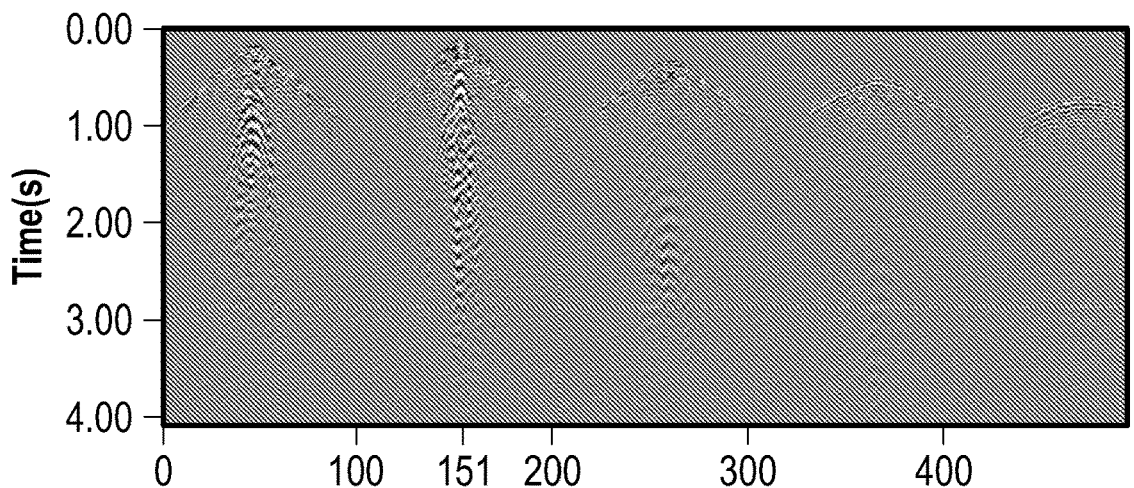
FIGS. 10A-10C illustrate a field data test with a trained neural network. In particular.
Figure 10B:
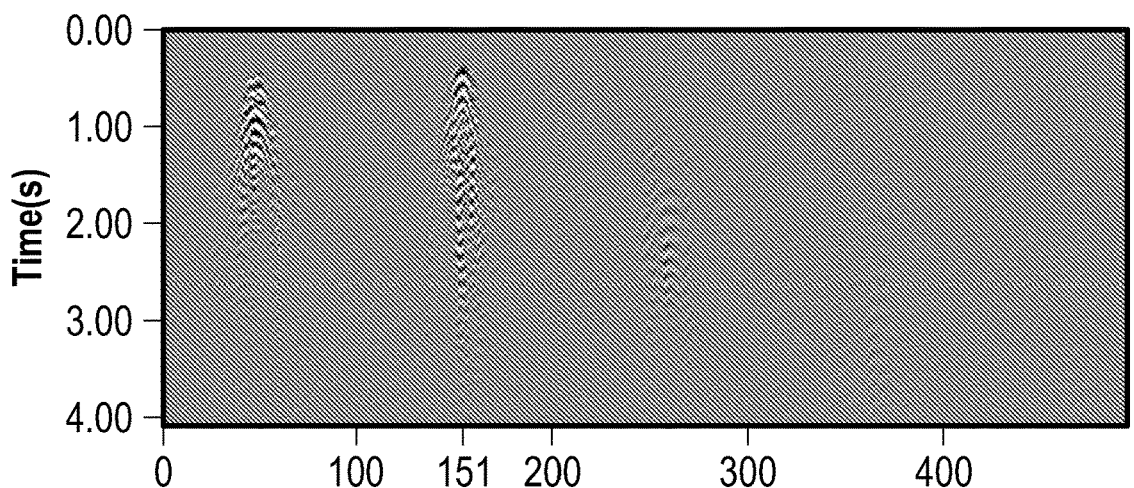
Figure 10C:
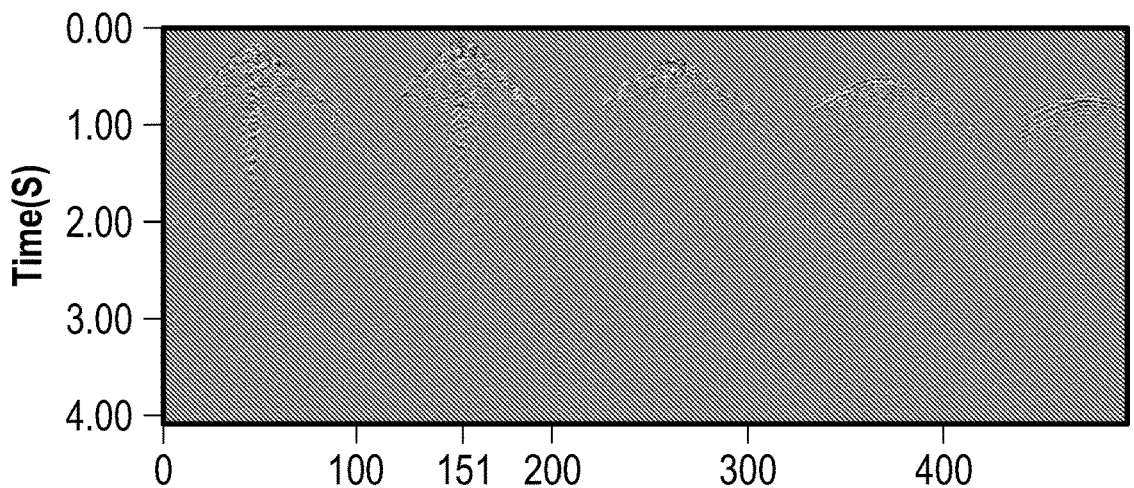

After training, the neural network was tested with the shot gathers unseen in the training. Because a fully convolutional neural network is being used, a size of the input in the test may not be a same size as was used during the training. The input is shown in FIG. 10A. The output Y of CNN B is shown in FIG. 10B, which represents estimated ground roll signals. Subtracting the estimated ground roll signals in FIG. 10B from the input shown in FIG. 10A yields a result after ground roll attenuation as shown in FIG. 10C. FIG. 10C shows that most of the ground rolls have been extracted after passing through the network.

Furthermore, the time and frequency domain of curve 151 (see FIGS. 10A and 10C) before and after attenuation are shown in FIGS. 11A and 111B, respectively. In a power spectrum, shown in FIG. 111B, low frequency components have been suppressed by nearly two orders. A time series of FIG. 11A shows that low component harmonics are largely removed.

The present disclosure includes an unsupervised deep learning approach to ground roll attenuation. The training does not call for extra effort to generate labels, which gives this method flexibility in field data ground roll attenuation. Furthermore, the nonlinear neural network helps to preserve the reflections' low frequency components while separating ground roll with high computation efficiency. This method has been validated with various field data test.

Computing Environment

In one or more embodiments, the described functions can be implemented in hardware, software, firmware, or any combination thereof. For a software implementation, techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software code can be stored in memory units and executed by processors. The memory unit can be implemented within the processor or external to the processor, in which case it can be communicatively coupled to the processor via various means as is known in the art.

Figure 12:
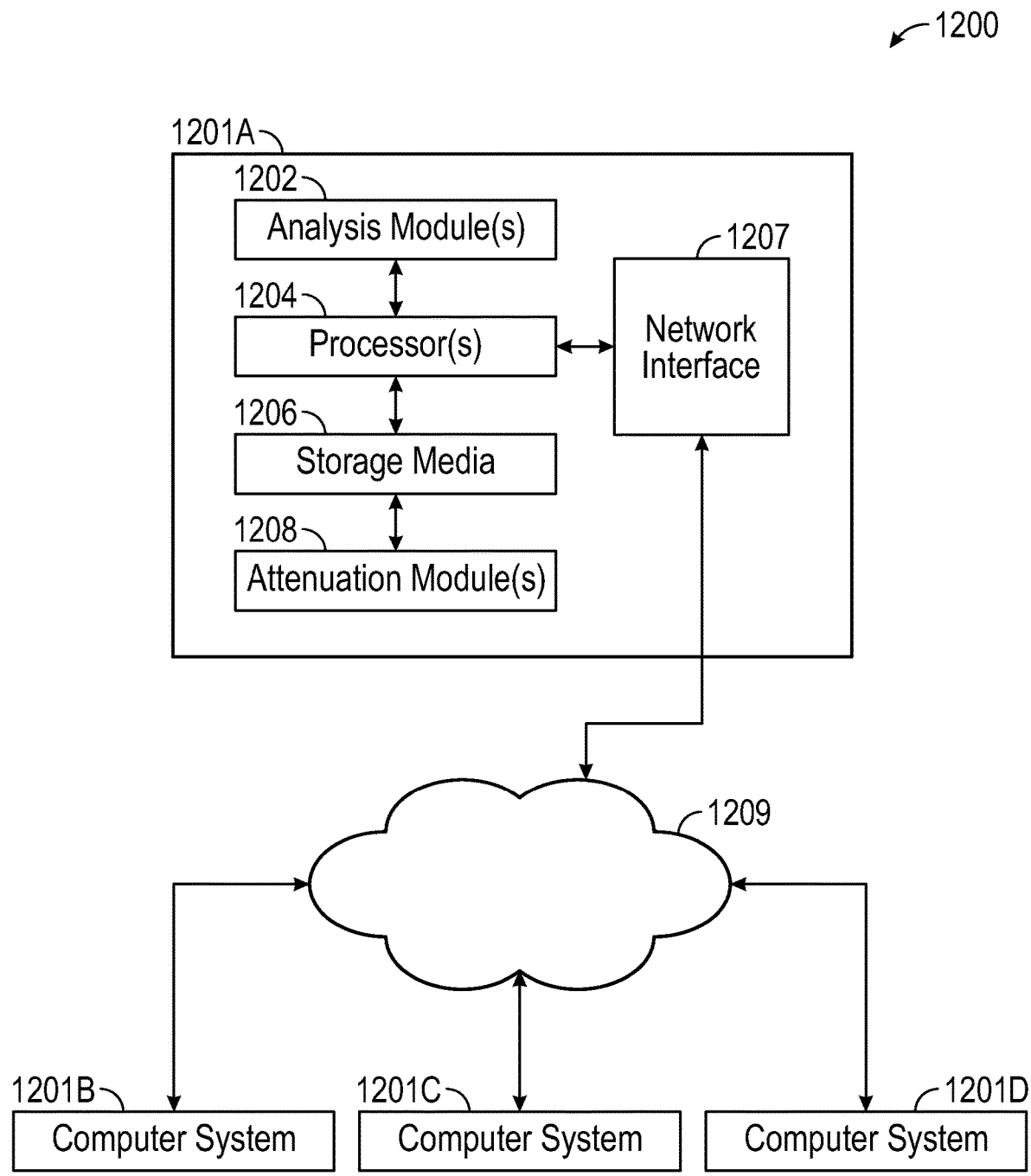
FIG. 12 illustrates a schematic view of a computing system, according to an embodiment.

In some embodiments, any of the methods of the present disclosure may be executed by a computing system. FIG. 12 illustrates an example of such a computing system 1200, in accordance with some embodiments. The computing system 1200 may include a computer or computer system 1201A, which may be an individual computer system 1201A or an arrangement of distributed computer systems. The computer system 1201A may include one or more analysis module(s)

1202 configured to perform various tasks according to some embodiments, such as one or more methods disclosed herein. To perform these various tasks, analysis module 1202 executes independently, or in coordination with, one or more processors 1204, which is (or are) connected to one or more storage media 1206. Processor(s) 1204 is (or are) also connected to a network interface 1207 to allow computer system 1201A to communicate over a data network 1209 with one or more additional computer systems and/or computing systems, such as 1201B, 1201C, and/or 1201D (note that computer systems 1201B, 1201C and/or 1201D may or may not share the same architecture as computer system 1201A, and may be located in different physical locations, e.g., computer systems 1201A and 1201B may be located in a processing facility, while in communication with one or more computer systems such as 1201C and/or 1201D that may be located in one or more data centers, and/or located in various countries that may be on different continents).

A processor can include a microprocessor, microcontroller, processor module or subsystem, programmable integrated circuit, programmable gate array, or another control or computing device.

Storage media 1206 can be implemented as one or more computer-readable or machine-readable storage media. Note that while in the example embodiment of FIG. 12 storage media 1206 is depicted as within computer system 1201A, in some embodiments, storage media 1206 may be distributed within and/or across multiple internal and/or external enclosures of computing system 1201A and/or additional computing systems. Storage media 1206 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly multiple nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 1200 may contain one or more attenuation module(s) 1208. In the example of computing system 1200, computer system 1201A may include an attenuation module 1208. In some embodiments, a single attenuation module may be used to perform some or all aspects of one or more embodiments of the methods. In alternate embodiments, multiple attenuation modules may be used to perform some or all aspects of methods.

It should be appreciated that computing system 1200 is only one example of a computing system, and that computing system 1100 may have more or fewer components than shown, may combine additional components not depicted in the example embodiment of FIG. 12, and/or computing system 1200 may have a different configuration or arrangement of the components depicted in FIG. 12. The various components shown in FIG. 12 may be implemented in hardware, software, or a combination of both hardware and software, including one or more signal processing and/or application specific integrated circuits.

Further, steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

Geologic interpretations, models and/or other interpretation aids may be refined in an iterative fashion; this concept is applicable to embodiments of the present methods discussed herein. This can include use of feedback loops executed on an algorithmic basis, such as at a computing device (e.g., computing system 1200, FIG. 12), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for attenuating noise in seismic data, comprising:
   receiving a seismic image;
   generating a first image using a first neural network configured to identify low frequency noise in the seismic image;
   generating a second image using a second neural network configured to identify reflections in the seismic image and to attenuate the low frequency noise;
   generating a combined image by combining the first image and the second image; and
   adjusting the first neural network and the second neural network to reduce a difference between the combined image and the seismic image using frequency constraint to guide separation of the seismic image into the first image and the second image.

2. The method of claim 1, further comprising:
   before the generating of the first image and the second image, generating, by a computing system, a binary mask, the binary mask having a value of 1 in an area of first arrival and a value of 0 otherwise, the generating of the binary mask comprising:
   binarizing a plurality of seismic images;
   training an encoder-decoder neural network to generate a smooth image from the binarized seismic images; and
   fitting in a vertical direction a 0-1 boundary with a sigmoid function.

3. The method of claim 2, wherein:
total data loss is a sum of data loss, a product of a first coefficient with a first regularization term that imposes a first frequency constraint, and a product of a second coefficient with a second regularization term that imposes a second frequency constraint,
the data loss is equal to a quotient calculated by dividing, by a number of 2D data sections per patch, a product of a squared Frobenius norm of the seismic data, as originally received, subtracted from an element-wise multiplication of the binary mask with a summation of outputs of the first neural network and the second neural network,
the first regularization term is equal to a quotient of a first summation along a first discrete frequency domain in a vertical direction from zero through a window size in the first discrete frequency domain of an absolute value of a two-dimensional Fourier transform function of X, divided by a number of pixels for computing a mean value of the first summation,
the second regularization term is equal to a quotient of a second summation along the first discrete frequency domain in a vertical direction from one plus the window size in the first discrete frequency domain through Q of an absolute value of a two-dimensional Fourier transform function of Y, divided by the number of pixels for computing the mean value of the first summation subtracted from the number of 2D data sections per patch,
the first discrete frequency domain is 1, . . . , Q, and
a second discrete frequency domain in a horizontal direction is 1, . . . , P.

4. The method of claim 2, further comprising:
applying the binary mask to the received seismic image to mask the noise before the area of first arrival in the received seismic image before the generating of the first image and the second image from the seismic image.

5. The method of claim 1, wherein an architecture of each of the first neural network and the second neural network comprises:
a first plurality of stacks of first convolutional layers separated by respective down sampling;
a second plurality of stacks of second convolutional layers separated by respective up sampling; and
a relu activation function after each convolutional layer of the first and the second convolutional layers except for an output layer.

6. The method of claim 5, wherein the architecture of each of the first neural network and the second neural network further comprises:
a skip connection from an output of a first stack of the first plurality of stacks to an input of a last stack of the second plurality of stacks.

7. The method of claim 1, further comprising:
normalizing, by a computing system, seismic data from the seismic image before providing the seismic image to the first neural network and the second neural network.

8. At least one non-transitory computer-readable medium storing instructions that, when executed by at least one processor of a computing system, cause the computing system to perform operations, the operations comprising:
receiving a seismic image;
generating a first image using a first neural network configured to identify low frequency noise, including ground roll, in the seismic image;
generating a second image using a second neural network configured to identify reflections in the seismic image and to attenuate the low frequency noise;
combining the first image and the second image to generate a combined image; and
adjusting the first neural network and the second neural network to reduce a difference between the combined image and the seismic image using frequency constraint to guide separation of the seismic image into the first image and the second image.

9. The at least one non-transitory computer-readable medium of claim 8, wherein the operations further comprise:
before the generating of the first image and the second image, applying a binary mask to the seismic image to remove noise before an area of first arrival in the seismic image.

10. The at least one non-transitory computer-readable medium of claim 9, wherein:
total data loss is a sum of data loss, a product of a first coefficient with a first regularization term that imposes a first frequency constraint, and a product of a second coefficient with a second regularization term that imposes a second frequency constraint,
the data loss is equal to a quotient calculated by dividing, by a number of 2D data sections per patch, a product of a squared Frobenius norm of the seismic data, as originally received, subtracted from an element-wise multiplication of the binary mask with a summation of outputs of the first neural network and the second neural network,
the first regularization term is equal to a quotient of a first summation, along a first discrete frequency domain in a vertical direction from zero through a window size in the first discrete frequency domain, of an absolute value of a two-dimensional Fourier transform function of X, divided by a number of pixels for computing a mean value of the first summation,
the second regularization term is equal to a quotient of a second summation along the first discrete frequency domain in the vertical direction from one plus the window size in the first discrete frequency domain through Q of an absolute value of a two-dimensional Fourier transform function of Y, divided by the number of pixels for computing the mean value of the first summation subtracted from the number of 2D data sections per patch,
the first discrete frequency domain is 1, . . . , Q, and
a second discrete frequency domain in a horizontal direction is 1, . . . , P.

11. The at least one non-transitory computer-readable medium of claim 8, wherein an architecture of each of the first neural network and the second neural network comprises:
a first plurality of stacks of first convolutional layers separated by respective down sampling;
a second plurality of stacks of second convolutional layers separated by respective up sampling; and
a relu activation function after each convolutional layer of the first and the second convolutional layers except for an output layer.

12. The at least one non-transitory computer-readable medium of claim 11, wherein:
the down sampling comprises one of max pooling and average pooling, and
the up sampling comprises using a nearest-neighbor interpolation method.

13. The at least one non-transitory computer-readable medium of claim 11, wherein the operations further comprise:
  normalizing seismic data from the seismic image before providing the seismic image to the first neural network and the second neural network, the normalized seismic data being calculated by subtracting a mean value of the seismic data before the normalizing from the seismic data before the normalizing, and dividing a result of the subtracting by a standard deviation of the seismic data before the normalizing.

14. The at least one non-transitory computer-readable medium of claim 11, wherein the architecture of each of the first neural network and the second neural network further comprises:
  a skip connection from an output of a first stack of the first plurality of stacks to an input of a last stack of the second plurality of stacks.

15. A computing system for attenuating low-frequency ground roll, comprising:
  one or more processors; and
  a memory system comprising one or more non-transitory computer-readable media storing instructions that, when executed by at least one of the one or more processors, cause the computing system to perform operations, the operations comprising:
  receiving a seismic image;
  generating a first image using a first neural network configured to identify the low-frequency ground roll in the seismic image;
  generating a second image using a second neural network configured to identify reflections in the seismic image;
  combining the first image and the second image to generate a combined image; and
  adjusting the first neural network and the second neural network to reduce a difference between the combined image and the seismic image using frequency constraint to guide separation of the seismic image into the first image and the second image.

16. The computing system of claim 15, wherein the operations further comprise:
  applying a binary mask to the seismic image, before the generating of the first image and the second image, to remove noise before an area of first arrival in the seismic image.

17. The computing system of claim 16, wherein:
  the operations further comprise normalizing seismic data from the seismic image before providing the seismic image to the first neural network and the second neural network, the normalized seismic data being calculated by subtracting a mean value of the seismic data before the normalizing from the seismic data before the normalizing, and dividing a result of the subtracting by a standard deviation of the seismic data before the normalizing,
  total data loss is a sum of data loss, a product of a first coefficient with a first regularization term that imposes a first frequency constraint, and a product of a second coefficient with a second regularization term that imposes a second frequency constraint,
  the data loss is equal to a quotient calculated by dividing, by a number of 2D data sections per patch, a product of a squared Frobenius norm of the seismic data, as originally received, subtracted from an element-wise multiplication of the binary mask with a summation of outputs of the first neural network and the second neural network,
  the first regularization term is equal to a quotient of a first summation, along a first discrete frequency domain in a vertical direction from zero through a window size in the first discrete frequency domain, of an absolute value of a two-dimensional Fourier transform function of X, divided by a number of pixels for computing a mean value of the first summation,
  the second regularization term is equal to a quotient of a second summation along the first discrete frequency domain in the vertical direction from one plus the window size in the first discrete frequency domain through Q of an absolute value of a two-dimensional Fourier transform function of Y, divided by the number of pixels for computing the mean value of the first summation subtracted from the number of 2D data sections per patch,
  the first discrete frequency domain is $1, \ldots, Q$, and
  a second discrete frequency domain in a horizontal direction is $1, \ldots, P$.

18. The computing system of claim 15, wherein:
  an architecture of each of the first neural network and the second neural network comprises:
  a first plurality of stacks of first convolutional layers separated by respective down sampling,
  a second plurality of stacks of second convolutional layers separated by respective up sampling, and
  a relu activation function after each convolutional layer of the first and the second convolutional layers except for an output layer; and
  the down sampling comprises one of max pooling and average pooling, and
  the up sampling comprises using a nearest-neighbor interpolation method.

19. The computing system of claim 18, wherein the architecture of each of the first neural network and the second neural network further comprises:
  a skip connection from an output of a first stack of the first plurality of stacks to an input of a last stack of the second plurality of stacks.

20. The computing system of claim 15, wherein the operations further comprise:
  normalizing seismic data from the seismic image before providing the seismic image to the first neural network and the second neural network, the normalized seismic data being calculated by subtracting a mean value of the seismic data before the normalizing from the seismic data before the normalizing, and dividing a result of the subtracting by a standard deviation of the seismic data before the normalizing.

* * * * *